United States Patent
Hirano et al.

(10) Patent No.: US 6,804,569 B1
(45) Date of Patent: Oct. 12, 2004

(54) DISTRIBUTED MANUFACTURING WITH FEEDBACK

(75) Inventors: Yasuyoshi Hirano, Poway, CA (US); Tokitaka Ito, San Diego, CA (US); Yukio Murakami, Escondido, CA (US); Joseph Freitas, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/561,496

(22) Filed: Apr. 28, 2000

Related U.S. Application Data

(60) Provisional application No. 60/132,035, filed on Apr. 30, 1999.

(51) Int. Cl.[7] .............................................. G06F 19/00
(52) U.S. Cl. ........................ 700/108; 700/95; 700/117; 700/116; 315/368.12; 315/370; 348/190; 348/807
(58) Field of Search ........................... 700/108, 95, 96, 700/116–118, 105; 445/3; 29/832, 564.1; 315/368.12, 370, 371; 348/177, 190, 569, 806, 807

(56) References Cited

U.S. PATENT DOCUMENTS

| | | | | |
|---|---|---|---|---|
| 4,757,239 A | * | 7/1988 | Starkey, IV ................. 315/371 |
| 4,759,123 A | * | 7/1988 | Ohta et al. ..................... 29/832 |
| 5,787,002 A | | 7/1998 | Iwamoto et al. | |
| 8,564,777 A | | 1/1999 | Smith et al. | |
| 5,873,759 A | * | 2/1999 | Ball et al. ....................... 445/3 |
| 5,960,405 A | | 9/1999 | Trefethan et al. | |
| 5,983,194 A | | 11/1999 | Hogge et al. | |
| 5,995,162 A | * | 11/1999 | Fujimori ..................... 348/569 |
| 6,014,168 A | * | 1/2000 | Webb et al. ................. 348/190 |

FOREIGN PATENT DOCUMENTS

JP            4-207384      *   7/1992

\* cited by examiner

*Primary Examiner*—Leo Picard
*Assistant Examiner*—Steven R. Garland
(74) *Attorney, Agent, or Firm*—Blakely, Sokoloff, Taylor & Zafman LLP

(57) ABSTRACT

Methods and apparatus implementing a technique for assembling a device, such as a digital convergence monitor, at more than one site where data is supplied from a first site to a second site and then the data is used in assembly of the device at the second site. In one implementation, a method for assembling a device at more than one manufacturing site includes: at least partially assembling a device at a first manufacturing site; adjusting the device at the first manufacturing site, where the adjustment is recorded in data; sending the data from the first manufacturing site to a second manufacturing site; assembling the device at the second manufacturing site; storing the data in the device; and adjusting the device at the second manufacturing site, where the adjustment at the second manufacturing site is recorded in the data.

28 Claims, 7 Drawing Sheets

DISTRIBUTED MANUFACTURING WITH FEEDBACK

This application claims the benefit of U.S. Provisional Patent Application No. 60/132,035, filed Apr. 30, 1999.

BACKGROUND

The present disclosure relates to distributed or remote manufacturing at multiple sites, and more specifically to manufacturing and assembling a device, such as a digital convergence monitor, at multiple sites and providing information from one site to another.

In a conventional process for manufacturing a cathode ray tube ("CRT") monitor, an integrated tube component ("ITC") is assembled. The ITC includes a CRT, a deflection yoke ("DY"), and typically one or more magnets or permalloy components. The construction and operation of CRTs and DYs are well known in the art. In manufacturing, the DY is mounted on the CRT. The location where an electron strikes the front panel of the CRT is referred to as "landing position." For desirable performance of the monitor and image quality, electrons in the CRT should have landing positions within defined locations or regions, such as phosphor stripes on the front panel of the CRT. The position of the DY is adjusted, as needed, to adjust the landing position of electrons in the CRT. The DY is then fixed in place on the CRT.

In addition to striking desired locations in the CRT, electrons should strike at desired times to provide unified dots of color in the image. When the electrons forming the colors of a dot do not strike the phosphor of the panel within the correct time frames, the colors may not blend properly resulting in a undesirable image. This timing problem is referred to as "misconvergence." Timing synchronization is referred to as "convergence." Proper convergence provides a desirable image. Accordingly, magnets can be applied to the CRT, ,as needed, to adjust convergence in the CRT. In another process, convergence circuitry in the CRT-DY assembly can be employed to adjust convergence using internal data register control. While convergence can be controlled by the CRT-DY assembly, there may be differences between specific CRT-DY assemblies in their performance relative to specified tolerances. For example, variations in material composition or component construction may cause these differences. The above techniques can be used to compensate,for these differences and correct the convergence of the monitor.

SUMMARY

The present disclosure describes methods and apparatus implementing a technique for assembling a device, such as a digital convergence monitor, at more than one site where data is supplied from a first site to a second site and then the data is used in assembly of the device at the second site. In one implementation, a method for assembling a device at more than one manufacturing site includes: at least partially assembling a device at a first manufacturing site; adjusting the device at the first manufacturing site, where the adjustment is recorded in data; sending the data from the first manufacturing site to a second manufacturing site; assembling the device at the second manufacturing site; storing the data in the device; and adjusting the device at the second manufacturing site, where the adjustment at the second manufacturing site is recorded in the data.

In another implementation, the method for assembling a device at more than one manufacturing site further includes: sending the data from the second manufacturing site to the first manufacturing site; comparing the data recording the adjustment at the first manufacturing site with the data recording the adjustment at the second manufacturing site; and adjusting equipment at the first manufacturing site based on one or more differences between the data recording the adjustment at the first manufacturing site and the data recording the adjustment at the second manufacturing site.

In another implementation, a method for assembling a digital convergence monitor at more than one manufacturing site includes: mounting a deflection yoke on a cathode ray tube forming a CRT-DY assembly at a first manufacturing site; measuring landing position in the cathode ray tube; moving the deflection yoke on the cathode ray tube as needed to correct the landing position; fixing the deflection yoke in place on the cathode ray tube; uniquely marking the cathode ray tube with an identification code; placing the CRT-DY assembly in an ITC jig, where the ITC jig includes a memory and the memory of the ITC jig is connected to the deflection yoke; storing control data in the memory of the ITC jig, where the control data is for controlling operation of the deflection yoke; measuring performance of the CRT-DY assembly in the ITC jig, including measuring convergence and distortion in the CRT-DY assembly; adjusting the control data stored in the memory of the ITC jig as needed to correct performance of the CRT-DY assembly, generating revised control data; removing the CRT-DY assembly from the ITC jig; sending the revised control data from the first manufacturing site to a network server, where the network server is accessible from the first manufacturing site and from a second manufacturing site; sending the revised control data from the network server to the second manufacturing site; receiving the CRT-DY assembly at the second manufacturing site; mounting the CRT-DY assembly in a digital chassis forming the digitial convergence monitor, where the digital chassis includes a memory and the memory of the digital chassis is connected to the deflection yoke; retrieving the revised control data from the memory at the second manufacturing site, where the identification code of the retrieved revised control data matches the identification code of the received CRT-DY assembly; storing the retrieved revised control data in the memory of the digital chassis; measuring performance of the digital convergence monitor, including measuring convergence and distortion in the digital convergence monitor; and adjusting the revised control data stored in the memory of the digital chassis as needed to correct performance of the digital convergence monitor, generating final control data.

In another implemention, the method for assembling a digital convergence monitor at more than one manufacturing site further includes: reading out the final control data stored in the memory of the digital chassis; storing the final control data in memory at the second manufacturing site; sending the revised control data from the second manufacturing site to the network server; sending the revised control data from the network server to the first manufacturing site; retrieving the revised control data from the memory at the first manufacturing site, where the identification code of the retrieved revised control data matches the identification code of the final control data received from the second manufacturing site; and comparing the final control data with the retrieved revised control data at the first manufacturing site.

In another implementation, a system for assembling a device at more than one manufacturing site includes: a network server; a first manufacturing site, where the first manufacturing site comprises: first assembly equipment for mounting a deflection yoke on a cathode ray tube, forming a CRT-DY assembly; first measurement equipment for measuring landing position, convegence, and distortion in the CRT-DY assembly; first adjustment equipment for adjusting control data which affects the operation of the deflection yoke; a first data connection connected to the first adjustmnet equipment and the network server; and a second manufacturing site, where the second manufacturing site comprises: second assembly equipment for mounting the CRT-DY assembly in a digital chassis, forming a digital convergence monitor; second measurement equipment for measuring landing position, convegence, and distortion in the digital convergence monitor; second adjustment equipment for adjusting control data which affects the operation of the deflection yoke; a second data connection connected to the second adjustment equipment and the network server, where control data is sent from the first manufacturing site to the second manufacturing site through the network server and the received control data is supplied to the digital convergence monitor.

DETAILED DESCRIPTION

Figure 1:
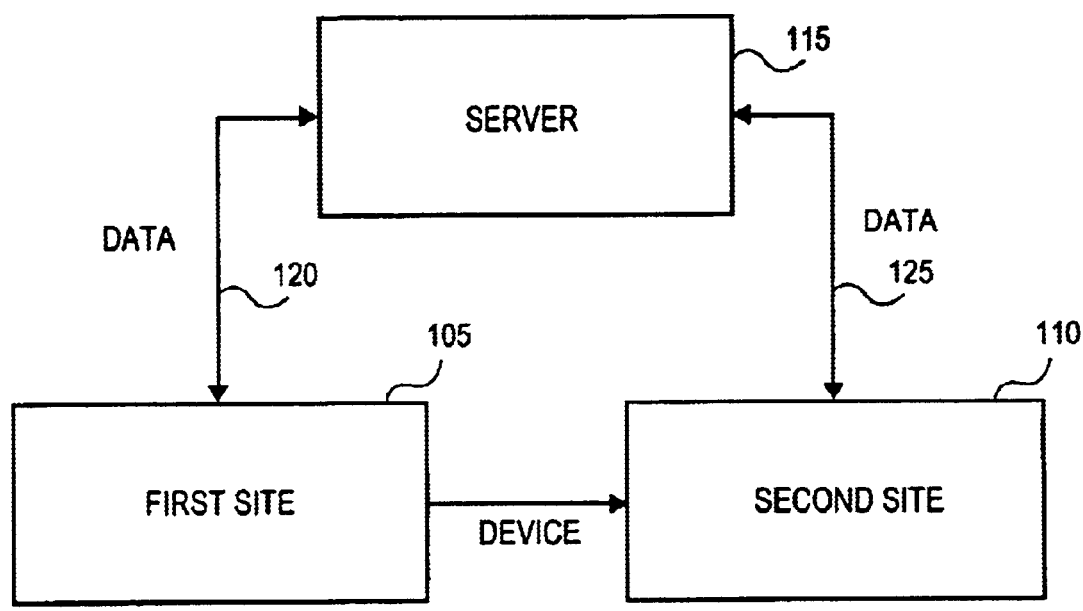
FIG. 1 shows a distributed manufacturing system.
Figure 2A:
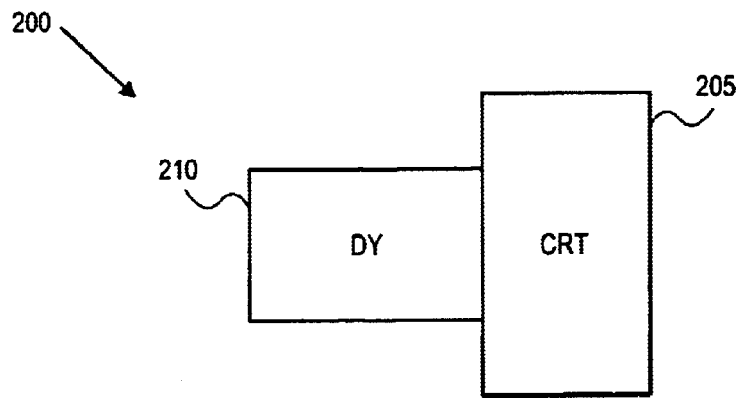
FIG. 2A shows a cathode ray tube-deflection yoke (CRT-DY) assembly.
Figure 2B:
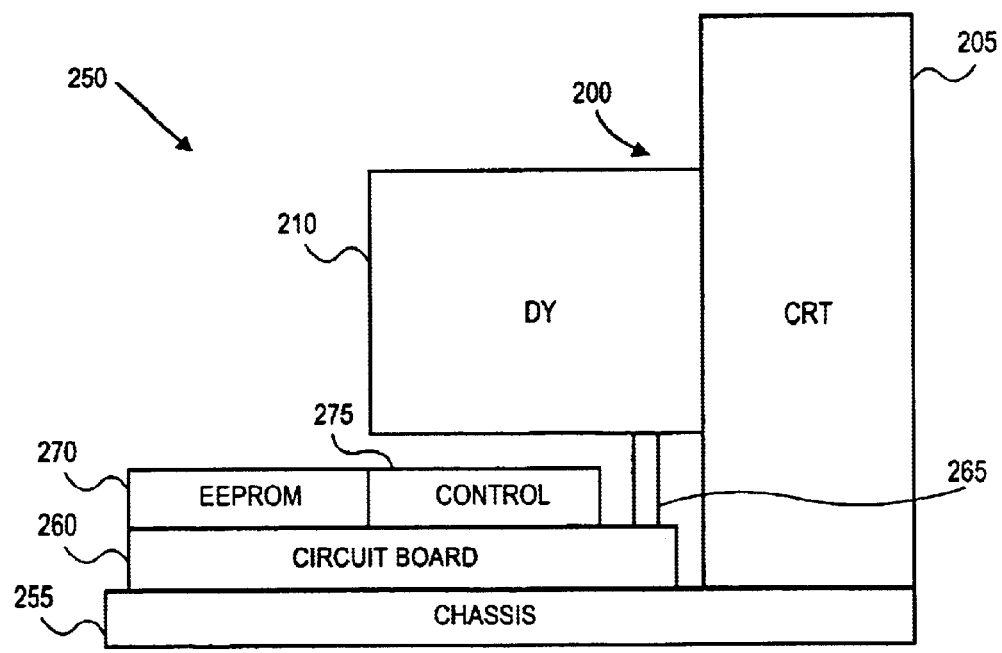
FIG. 2B shows a digital convergence monitor (DCM).
Figure 3A:
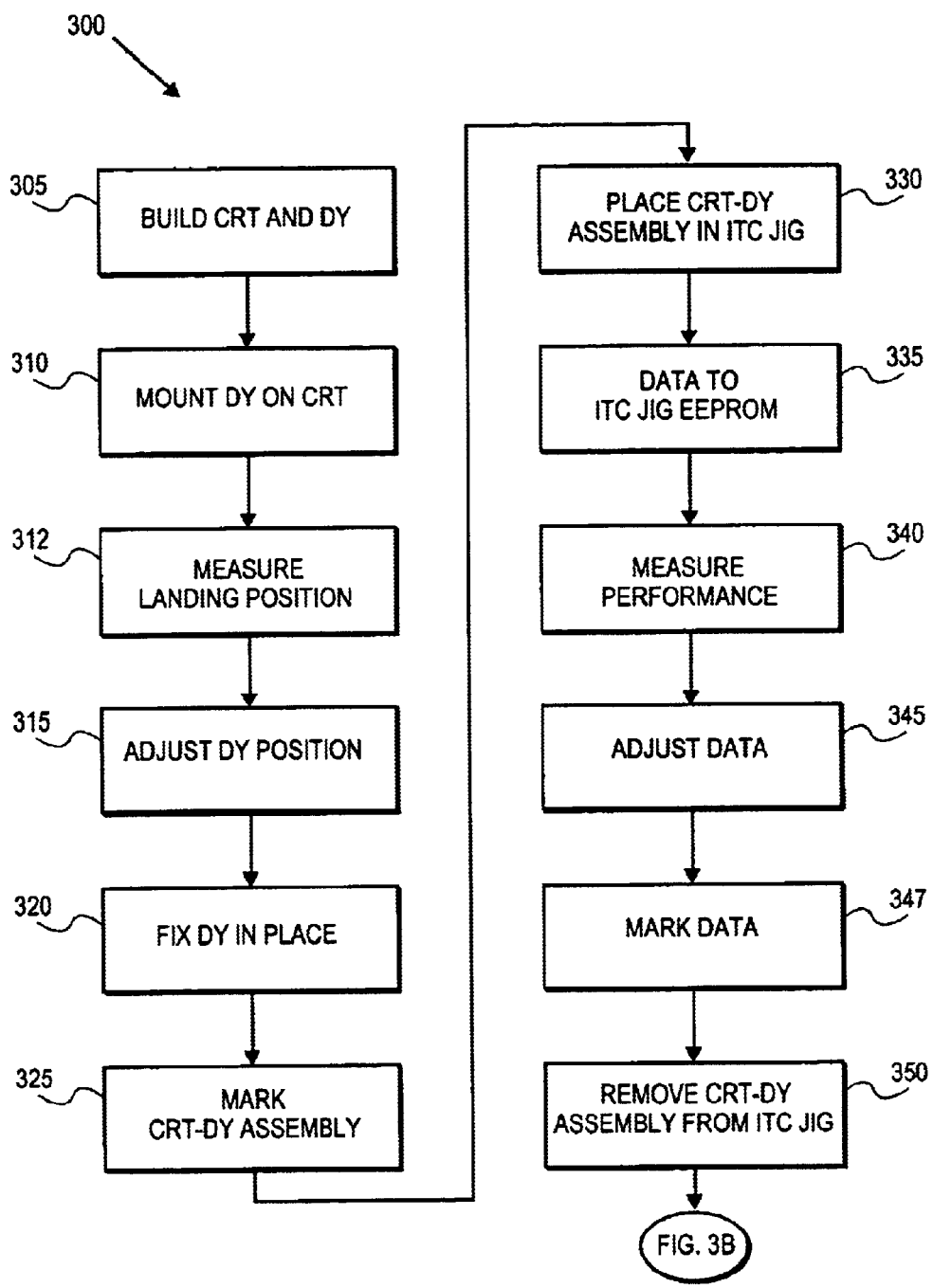
FIGS. 3A and 3B show a flowchart of a process for assembling a DCM.
Figure 3B:
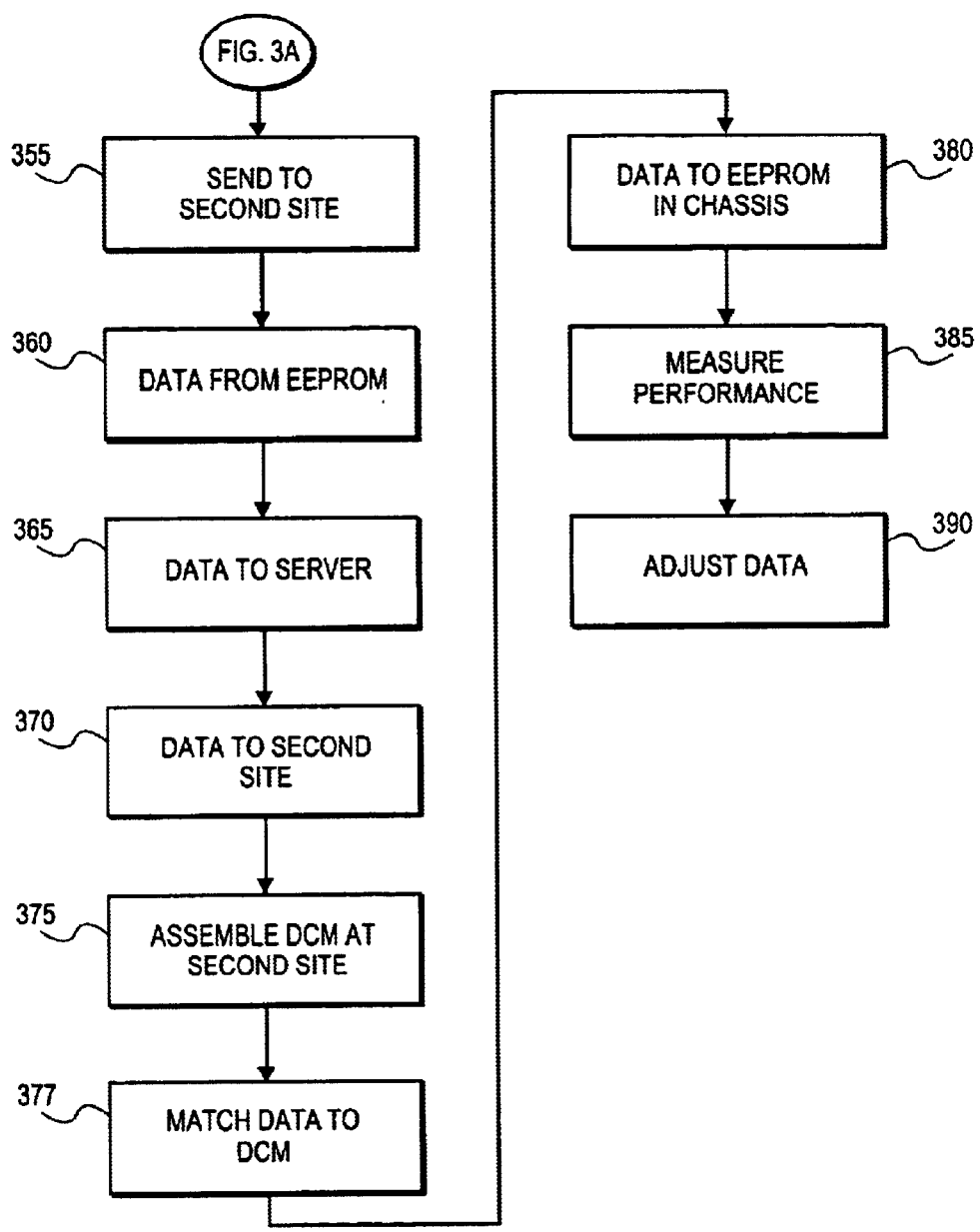

The present disclosure describes methods and apparatus for assembling a device at more than one site where data is supplied from a first site to a second site and then the data is used to complete assembly of the device. FIG. 1 shows a system configuration of sites and a data connection. In one implementation, the device is a digital convergence monitor ("DCM") and the data is control data for a deflection yoke ("DY") in the DCM. FIGS. 2A and 2B show components of a DCM. FIGS. 3A and 3B show a process for assembling a DCM.

FIG. 1 shows a distributed manufacturing system 100. Distributed manufacturing system 100 includes a first manufacturing site 105 and a second manufacturing site 110. Site 105 supplies devices to site 110. Site 105 can send devices to site 110 through various physical channels, such as by truck, plane, or ship. Site 105 and site 110 are also connected to a network server computer 115 through data connections 120 and 125, respectively. Data connections 120 and 125 provide data between sites 105 and 110 and server 115. Data connections 120 and 125 can be implemented in various ways, such as direct private connections to server 115 or Internet connections. For example, server 115 can be a file transfer protocol ("FTP") server accessible from sites 105 and 110 across the Internet. As described below, data transfer can occur on demand or automatically, such as according to a regular schedule. Sites 105 and 110 include or have access to storage for data to be sent to and received from server 115. This storage can then be accessible to equipment and work stations within the site, such as through an internal network. In addition, server 115 can be implemented as part of either site 105 or site 110, in which case a single data connection between sites 105 and 110 can be sufficient.

FIG. 2A shows a CRT-DY assembly 200. CRT-DY assembly 200 includes a cathode ray tube ("CRT") 205 and a deflection yoke ("DY") 210. DY 210 is mounted on CRT 205. Wedges (not shown) are inserted between CRT 205 and DY 210, holding DY 210 in place. Alternative techniques can be used for holding DY 210 in place, such as an adhesive or clamps.

FIG. 2B shows a DCM 250. DCM 250 includes CRT-DY assembly 200 mounted in a digital chassis 255. Digital chassis 255 includes a circuit board 260 and a connection 265 from circuit board 260 to CRT-DY assembly 200. Connection 265 can be implemented in various ways, such as a cable between circuit board 260 and DY 210 or a hard connection between DY 210 and digital chassis 255 where digital chassis 255 contacts DY 210. Circuit board 260 includes an EEPROM 270 and control circuitry 275. EEPROM 270 stores control data which is supplied to DY 210 through connection 265. Control data adjusts the operation of DY 210 to correct convergence and distortion in the image provided by CRT-DY assembly 200. In some DCMs, control data can also be used to correct landing position. Control circuitry 275 controls the operation of digital chassis 255, including the supply of control data from EEPROM 270 to DY 210. The operation of a DCM and the use of control data is well understood by those of ordinary skill in the art.

FIGS. 3A and 3B show a flowchart of a process 300 for assembling a DCM (FIG. 3A continues into FIG. 3B). To describe process 300 more clearly, references to FIGS. 1, 2A, and 2B are used below. A CRT 205 and a DY 210 are built at a first manufacturing site 105, step 305. Alternatively, either or both of CRT 205 and DY 210 are built somewhere other than site 105 and then supplied to site 105. DY 210 is mounted on CRT 205, step 310. The landing position of electrons in CRT 205 is measured, step 312. The position of DY 210 on CRT 205 is adjusted, as necessary, to correct the landing position, step 315. Correct landing position can be defined by a specified tolerance for landing position to provide a desirable image, such as a specification supplied by the manufacturer of the DCM (which may own some or all of distributed manufacturing system 100, but, in any case, the party who determines "desirable" performance for the DCM). DY 210 is fixed in place on CRT 205, such as by inserting wedges between DY 210 and CRT 205, step 320. By fixing DY 210 in place, the corrected landing position is preserved. CRT 205 is uniquely marked with an identification code, such as with a barcode, step 325. Marking CRT 205 completes a CRT-DY assembly 200. Alternatively, CRT 205 can be marked earlier in process 300 or prior to process 300, such as during the manufacture of CRT 205. In another alternative implementation, the marking is applied to DY 210 instead of, or in addition to, CRT 205.

CRT-DY assembly 200 is mounted in an ITC jig, step 330. ITC jig is a digital chassis (recall digital chassis 255 in FIG. 2B) which is used at site 105 for measurement and adjustment. ITC jig 255 is used for each CRT-DY assembly assembled at site 105. Alternatively, multiple ITC jigs can be used. As shown in FIG. 2B, ITC jig 255 includes an EEPROM 270. In mounting CRT-DY assembly 200 in ITC jig 255, DY 210 is connected to circuit board 260 through connection 265. Control data ("initial control data") is supplied to and stored in EEPROM 270 of ITC jig 255, step 335. This control data is used to control DY 210, as noted above. The initial control data is supplied to EEPROM 270 for each CRT-DY assembly placed in ITC jig 255. The performance of CRT-DY assembly 200 in ITC jig 255 is compared to specified tolerances for convergence and distortion, step 340. As with landing position, these specified tolerances can be provided by the DCM manufacturer. In addition, other aspects of performance can be measured at this time, such as brightness. The control data in EEPROM 270 is revised to bring CRT-DY assembly 200 performance within tolerance, step 345. This revised control data reflects adjustments necessary to bring the particular CRT-DY assembly 200 within tolerance and may be different between CRT-DY assemblies. The revised control data is marked with the same marking as CRT-DY assembly 200, to create a unique association between the revised control data and CRT-DY assembly 200, step 347. The association can be created earlier, such as when the initial control data is stored in EEPROM 270, or later, such as when the revised control data is read out of EEPROM 270 using a separately stored record of the marking on CRT-DY assembly 200. CRT-DY assembly 200 is removed from ITC jig 255, step 350, and sent to a second manufacturing site 110, step 355.

The marked revised control data in EEPROM 270 of ITC jig 255 is read out of EEPROM 270 and stored in local storage at site 105, step 360. The marked revised control data is sent from site 105 to a network server 115, step 365. The marked revised control data is then sent from network server 115 to site 110 and stored in local storage at site 110, step 370. The transmission from server 115 to site 110 can be at the request of site 110, or can be automated through hardware or software, so can occur before or after the arrival of CRT-DY assembly 200 at site 110.

At site 110, CRT-DY assembly 200 is mounted in a digital chassis 255 forming a DCM 250, step 375. This digital chassis 255 is unique for CRT-DY assembly 200, and will not be re-used for another CRT-DY assembly (unlike the ITC jig at site 105, described above). Marked revised control data matching the marking on CRT-DY assembly 200 is retrieved from storage at site 110, step 377. The matching revised control data is stored in EEPROM 270 of digital chassis 255, step 380. The performance of DCM 250 is compared to specified tolerances for convergence and distortion, step 385. As described above, the specifications can be supplied by the DCM manufacturer. If any changes are necessary, the control data in EEPROM 270 is modified to bring the performance within specified tolerances, step 390. This final control data remains with DCM 250, stored in EEPROM 270. In one implementation, a DCM includes external controls, accessible by a consumer, which can be used to further modify the control data and adjust the performance of the DCM. DCM 250 is then packaged and shipped. Alternatively, external packaging can be provided later.

Figure 4:
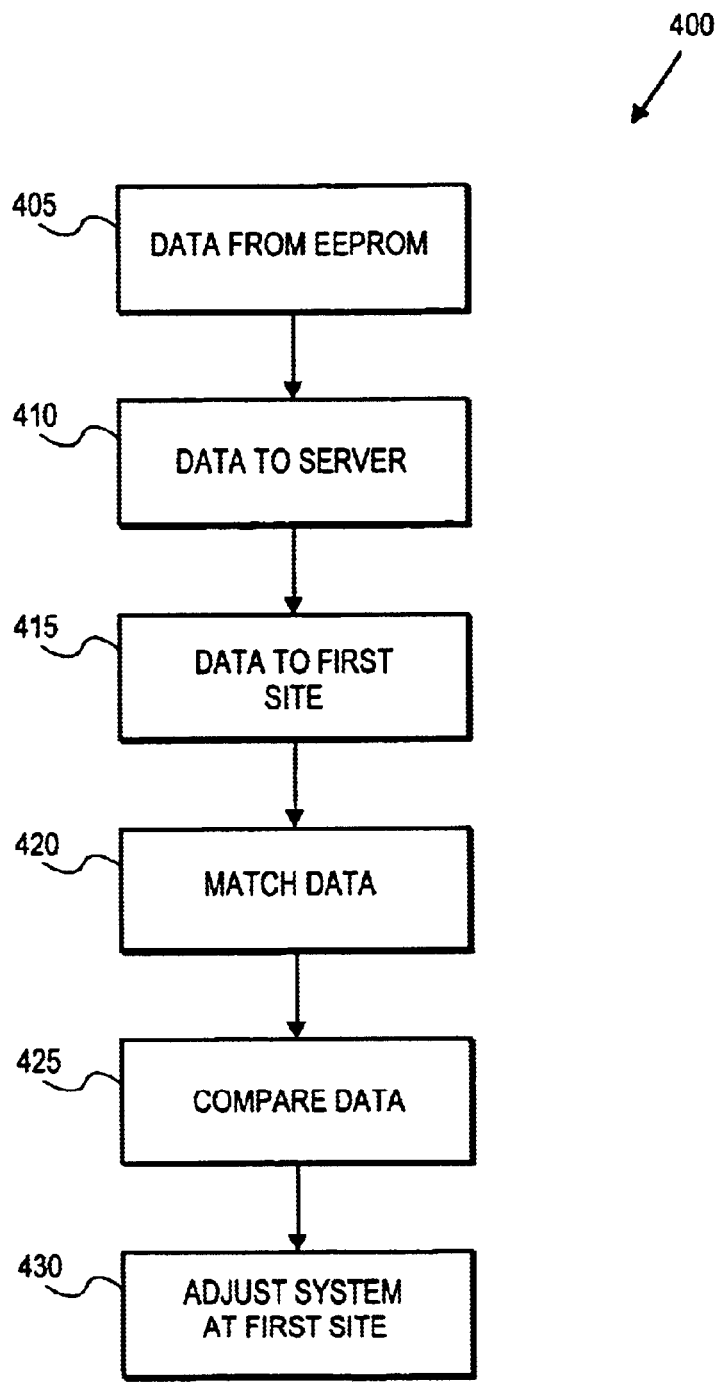
FIG. 4 shows a flowchart of a process for providing feedback from a second site to a first site after the process in FIG. 3.

FIG. 4 shows a flowchart of a process 400 for providing feedback from the second site (site 110 in FIG. 1) to the first site (site 105 in FIG. 1) after step 390 of process 300 in FIG. 3B. The final control data and the marking for the matching CRT-DY assembly are read out of EEPROM 270 and stored in site 110, step 405. The marked final control data is sent from site 110 to server 115, step 410, and then sent from server 115 to site 105, step 415. At site 105, the marked revised control data (previously stored in step 360 of process 300) which matches the marking of the marked final control data is retrieved, step 420, and the two sets of control data are compared, step 425. Accordingly, the revised control data and final control data which correspond to the same CRT-DY assembly are compared. Variations between the two sets of data are identified and analyzed, and adjustments can be made to equipment or procedures based on those variations, step 430. Variation between the two sets of data can indicate that the revised data did not actually place CRT-DY assembly 200 within specified tolerance. These variations can arise from faults within the adjustment equipment of site 105. For example, the ITC jig is used repeatedly for many CRT-DY assemblies and so may gradually lose quality of performance due to wear. This loss may come from degraded connections or material in the circuit board. In another example, the measuring equipment at site 105 may need to be replaced or adjusted to conform with equipment at site 110. Variations can also indicate problems in the transportation process between site 105 and site 110 which have lead to changes in performance of the CRT-DY assembly, such as shifting of the DY relative to the CRT.

Figure 5:
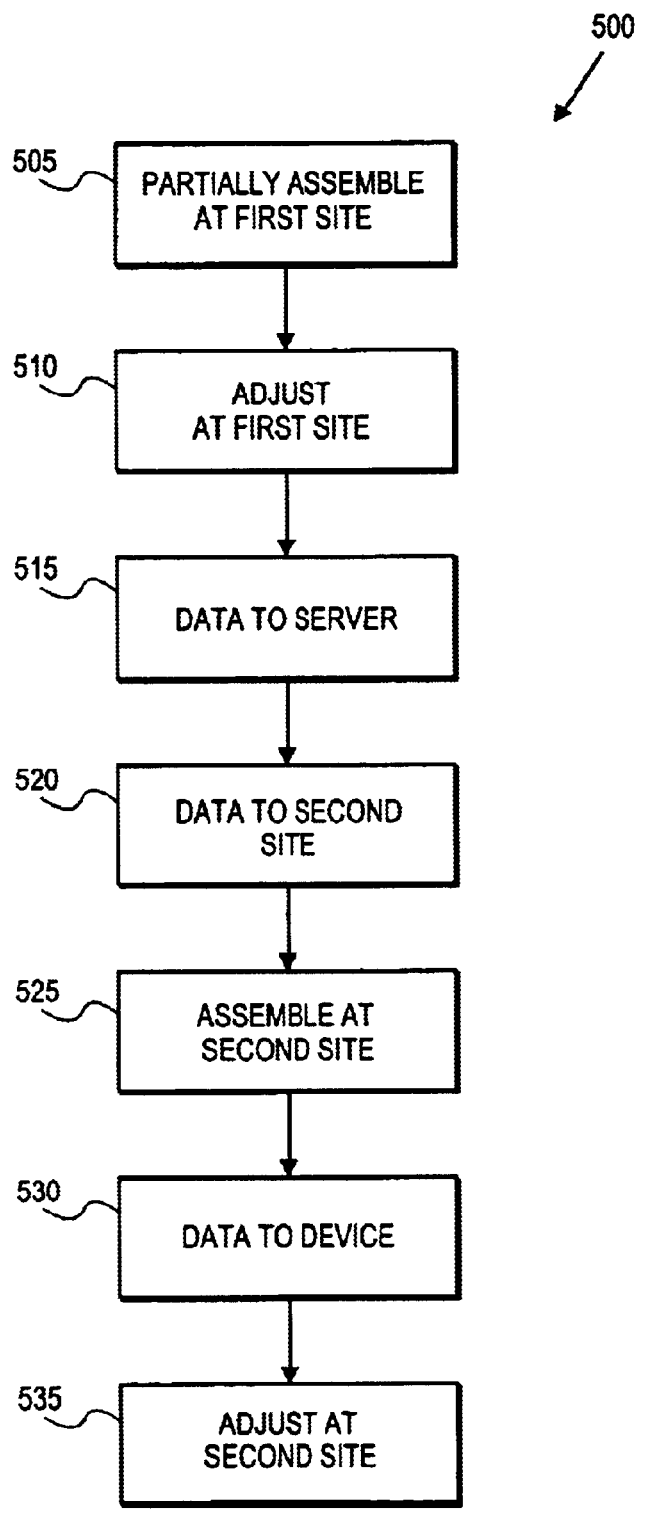
FIG. 5 shows a flowchart of a process for assembling a device, such as a DCM or other device, at two sites where data is supplied from the first site to the second site and then the data is used to complete assembly of the device at the second site.

FIGS. 2–4 illustrate implementations where the device is a DCM. FIG. 5 shows a flowchart of a process 500 for assembling a device, such as a DCM or other device, at two sites where data is supplied from the first site to the second site and then the data is used to complete assembly of the device at the second site. To describe process 500 more clearly, references to FIG. 1 are made below. The device is partially assembled at a first manufacturing site 105, step 505. The performance of the partially assembled device is measured and, if necessary, adjusted at site 105, step 510. The adjustment can be made to improve performance of the device or bring the performance of the device within a specified level of performance. The adjustment to the device is reflected in data associated with the device, such as data stored in memory included in or connected to the device (e.g., the control data in the EEPROM of the ITC jig, described above). In addition, the data is marked with an identification code to correspond to the specific partially assembled device. The data is sent to a network server 115, step 515. The data is then sent from the server 115 to a second manufacturing site 110, step 520. Alternatively, the data can be sent directly from site 105 to site 110. The partially assembled device is sent to site 110 and additional components are added, step 525. Alternatively, the device can be disassembled before being sent to site 110 and re-assembled at site 110, with or without additional components. In another alternative, additional components are not added at site 110, but the measurements performed at site 110 are different from those performed at site 105. The data received at site 110 from site 105 which matches the device is stored in the device, step 530. The performance of the device is measured and, if necessary, adjusted at site 110, step 535. The data is modified in accordance with the adjustment made. After the device has been adjusted, the device is complete. Alternatively, further processing or assembly is performed on the device at site 110 or at another site.

Figure 6:
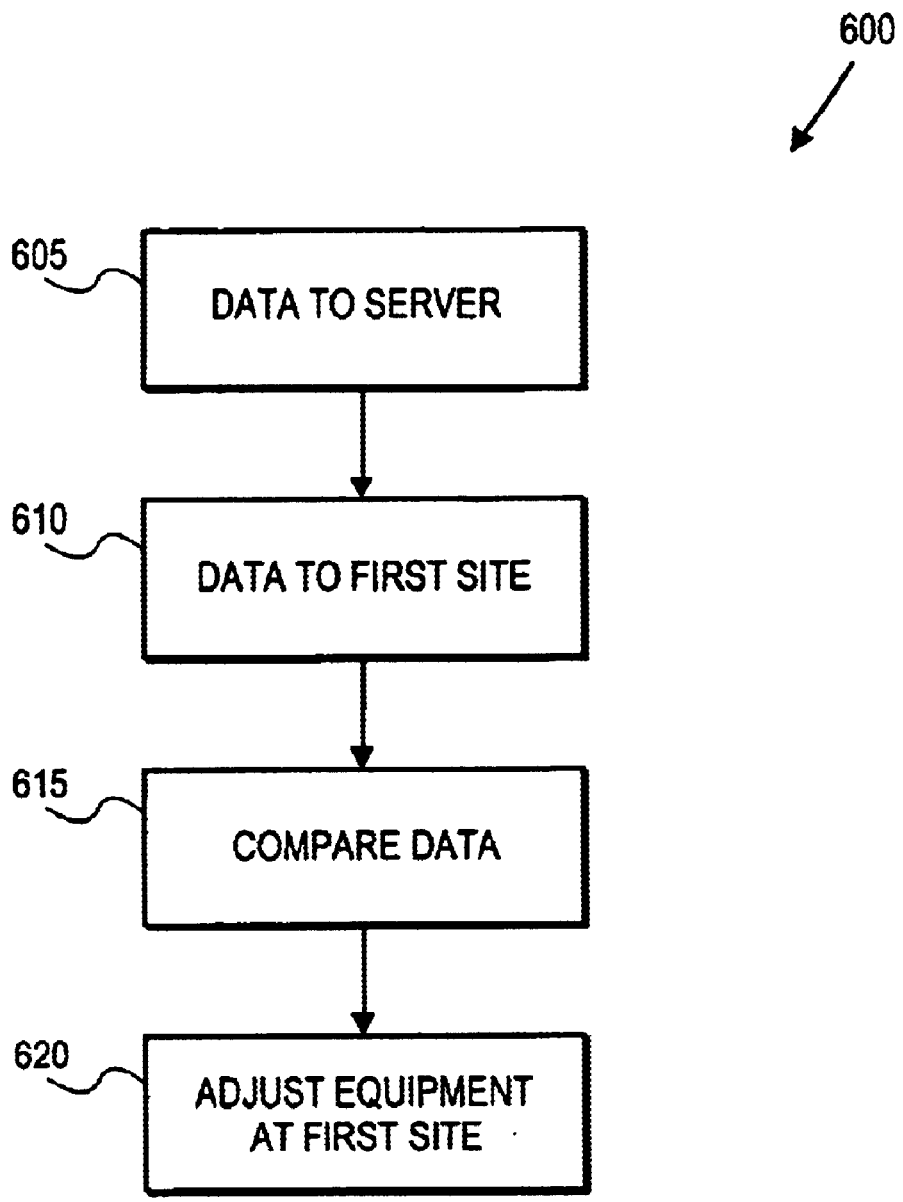
FIG. 6 shows a flowchart of a process for providing feedback from a second site to a first site after the process in FIG. 5.

FIG. 6 shows a flowchart of a process 600 for providing feedback from the second site (site 110 in FIG. 1) to the first site (site 105 in FIG. 1) after step 535 of process 500 in FIG. 5. The data reflecting the adjustment of step 535 is sent back from site 110 to server 115, step 605. The data is then sent from server 115 to site 105, step 610. The data from the adjustment in step 535 is compared with the data from the adjustment in step 510, step 615. The data are matched for comparison using markings on the device and stored within the data. Any variation between the data is used to adjust equipment or processes at site 105. As described above, these variations may reflect faults in the system at site 105 which can be corrected through feedback from site 110.

Various implementations have been described above. However, this description is illustrative and not limiting. Accordingly, additional implementations are possible. For example, control data can be stored in various locations, such as in storage at one of the sites or in remote storage accessible across a network. In another example, assembly can occur at more than two sites with data being transferred among some or all of the sites, or assembly can occur within a single site where data is transferred between locations within the site.

What is claimed is:

1. A method for assembling a digital convergence monitor at more than one manufacturing site, comprising:
   at least partially assembling the digital convergence monitor at a first manufacturing site by mounting a deflection yoke on a cathode ray tube forming a CRT-DY assembly, the CRT-DY assembly being uniquely marked with an identification code;
   adjusting the digital convergence monitor at the first manufacturing site to produce revised control data;
   marking the revised control data with the identification code;
   sending the revised control data from the first manufacturing site to a second manufacturing site;
   assembling the digital convergence monitor at the second manufacturing site by receiving the CRT-DY assembly at the second manufacturing site and mounting the CRT-DY assembly in a digital chassis forming the digital convergence monitor, the digital chassis comprises a memory connected to the deflection yoke;
   storing the data in the digital convergence monitor at the second manufacturing site; and
   adjusting the digital convergence monitor at the second manufacturing site, where the adjustment at the second manufacturing site is recorded in the data by measuring convergence and distortion in the digital convergence monitor, and adjusting the revised control data stored in the memory of the digital chassis to correct performance of the digital convergence monitor and to generate a final control data;
   marking the final control data with the identification code;
   sending the final control data from the second manufacturing site to the first manufacturing site;
   retrieving the revised control data from memory at the first manufacturing site, where an identification code of the retrieved revised control data matches an identification code of the final control data received from the second manufacturing site; and
   comparing the final control data with the retrieved revised control data at the first manufacturing site.

2. The method of claim 1, where the revised control data is sent from the first manufacturing site to the second manufacturing site across the Internet.

3. The method of claim 1, where sending the revised control data from the first manufacturing site to the second manufacturing site comprises:
   sending the revised control data from the first manufacturing site to a network server, where the network server is accessible from the first manufacturing site and from a second manufacturing site; and
   sending the revised control data from the network server to the second manufacturing site.

4. The method of claim 3, where the first manufacturing site is connected to the network server across the Internet.

5. The method of claim 3, where the second manufacturing site is connected to the network server across the Internet.

6. The method of claim 1, wherein adjustment of the digital convergence monitor further comprising:
   measuring landing position in the cathode ray tube;
   moving the deflection yoke on the cathode ray tube as needed to correct the landing position; and
   fixing the deflection yoke in place on the cathode ray tube.

7. The method of claim 1, where the identification code marking the CRT-DY assembly is a bar code.

8. The method of claim 1, where the revised control data is control data for controlling operation of the deflection yoke.

9. The method of claim 8, where adjusting the digital convergence monitor at the first manufacturing site comprises:
   placing the CRT-DY assembly in an ITC jig, where the ITC jig includes a memory and the memory of the ITC jig is connected to the deflection yoke;
   storing the control data in memory of the ITC jig;
   measuring performance of the CRT-DY assembly in the ITC jig;
   adjusting the control data to produce revised control data stored in the memory of the ITC jig as needed to correct performance of the CRT-DY assembly; and
   removing the CRT-DY assembly from the ITC jig.

10. The method of claim 9, where measuring performance of the CRT-DY assembly in the ITC jig comprises measuring convergence in the CRT-DY assembly.

11. The method of claim 10, where measuring performance of the CRT-DY assembly in the ITC jig further comprises measuring distortion in the CRT-DY assembly.

12. The method of claim 11, where adjusting the control data stored as the revised control data in the memory of the ITC jig as needed to correct performance of the CRT-DY assembly comprises adjusting the control data as needed to correct convergence and distortion in the CRT-DY assembly.

13. The method of claim 12, further comprising marking the revised control data with the same identification code as the identification code used to mark the CRT-DY assembly.

14. The method of claim 13, further comprising:
   reading out the revised control data stored in the memory of the ITC jig;
   storing the revised control data in memory at the first manufacturing site.

15. The method of claim 14, further comprising storing the revised control data in memory at the second manufacturing site.

16. The method of claim 1, where storing the data in the digital convergence monitor at the second manufacturing site comprises:
   retrieving the revised control data from the memory at the second manufacturing site, where the identification code of the retrieved revised control data matches the identification code of the received CRT-DY assembly;
   storing the retrieved revised control data in the memory of the digital chassis.

17. The method of claim 16, wherein prior to sending the final control data, the method further comprising:
   reading out the final control data stored in the memory of the digital chassis; and
   storing the final control data in memory at the second manufacturing site.

18. The method of claim 1, further comprising adjusting equipment at the first manufacturing site based on one or more differences between the final control data and the revised control data.

19. The method of claim 1, further comprising adjusting one or more procedures at the first manufacturing site based on one or more differences between the final control data and the revised control data.

20. The method of claim 1, where sending the final control data from the second manufacturing site to the first manufacturing site comprises:
sending the final control data from the second manufacturing site to a network server; and
sending the final control data from the network server to the first manufacturing site.

21. The method of claim 1, where the revised control data is sent from the first manufacturing site to the second manufacturing site automatically.

22. A method for assembling a device at more than one manufacturing site comprising:
at least partially assembling the device at a first manufacturing site;
adjusting the device at the first manufacturing site, where the adjustment is recorded as revised control data;
sending the data from the first manufacturing site to a second manufacturing site where the revised data is stored in the device, the device is adjusted at the second manufacturing site and the adjustment is recorded as final control data;
sending the final control data to the first manufacturing site;
comparing the revised control data recording the adjustment at the first manufacturing site with the final control data recording the adjustment at the second manufacturing site; and
adjusting equipment at the first manufacturing site based on one or more differences between the revised control data recording the adjustment at the first manufacturing site and the final control data recording the adjustment at the second manufacturing site.

23. The method of claim 22, where the final control data to the first manufacturing site comprises:
sending the final control data from the second manufacturing site to a network server; and
sending the final control data from the network server to the first manufacturing site.

24. The method of claim 22, where the final control data is sent from the second manufacturing site to the first manufacturing site automatically.

25. A method for assembling a digital convergence monitor at more than one manufacturing site, comprising:
mounting a deflection yoke on a cathode ray tube forming a CRT-DY assembly at a first manufacturing site;
measuring landing position in the cathode ray tube;
moving the deflection yoke on the cathode ray tube as needed to correct the landing position;
fixing the deflection yoke in place on the cathode ray tube;
uniquely marking the cathode ray tube with an identification code;
placing the CRT-DY assembly in an ITC jig, where the ITC jig includes a memory and the memory of the ITC jig is connected to the deflection yoke;
storing control data in the memory of the ITC jig, where the control data is for controlling operation of the deflection yoke;
measuring performance of the CRT-DY assembly in the ITC jig, including measuring convergence and distortion in the CRT-DY assembly;
adjusting the control data stored in the memory of the ITC jig as needed to correct performance of the CRT-DY assembly, generating revised control data;
removing the CRT-DY assembly from the ITC jig;
sending the revised control data from the first manufacturing site to a network server, where the network server is accessible from the first manufacturing site and from a second manufacturing site;
sending the revised control data from the network server to the second manufacturing site;
receiving the CRT-DY assembly at the second manufacturing site;
mounting the CRT-DY assembly in a digital chassis forming the digital convergence monitor, where the digital chassis includes a memory and the memory of the digital chassis is connected to the deflection yoke;
retrieving the revised control data from a memory at the second manufacturing site, where an identification code of the retrieved revised control data matches an identification code associated with the received CRT DY assembly;
storing the retrieved revised control data in the memory of the digital chassis;
measuring performance of the digital convergence monitor, including measuring convergence and distortion in the digital convergence monitor;
adjusting the revised control data stored in the memory of the digital chassis as needed to correct performance of the digital convergence monitor, generating final control data and storing in the memory of the digital chassis;
reading out the final control data stored in the memory of the digital chassis;
storing the final control data in memory at the second manufacturing site;
sending the final control data from the second manufacturing site to the network server;
sending the final control data from the network server to the first manufacturing site;
retrieving the revised control data from memory at the first manufacturing site, where the identification code of the retrieved revised control data matches an identification code of final control data received from the second manufacturing site; and
comparing the final control data with the retrieved revised control data at the first manufacturing site.

26. The method of claim 25, further comprising adjusting equipment at the first manufacturing site based on one or more differences between the final control data and the revised control data.

27. The method of claim 25, further comprising adjusting one or more procedures at the first manufacturing site based on one or more differences between the final control data and the revised control data.

28. A system for assembling a device at more than one manufacturing site further comprising:
means for at least partially assembling a device at a first manufacturing site;
means for adjusting the device at the first manufacturing site, where the adjustment is recorded in data;
means for sending the data from the first manufacturing site to a second manufacturing site;

means for assembling the device at the second manufacturing site;

means for storing the data in the device at the second manufacturing site;

means for adjusting the device at the second manufacturing site, where the adjustment at the second manufacturing site is recorded in the data;

means for sending the data from the second manufacturing site to the first manufacturing site;

means for comparing the data recording the adjustment at the first manufacturing site with the data recording the adjustment at the second manufacturing site; and means for adjusting equipment at the first manufacturing site based on one or more differences between the data recording the adjustment at the first manufacturing site and the data recording the adjustment at the second manufacturing site.

* * * * *